US008409443B2

(12) United States Patent
Gilar et al.

(10) Patent No.: US 8,409,443 B2
(45) Date of Patent: Apr. 2, 2013

(54) VESSEL, DISPENSING DEVICES, KITS AND METHODS FOR CONTAINING FLUIDS

(75) Inventors: Martin Gilar, Franklin, MA (US); Christopher C. Benevides, Tiverton, RI (US); Jennifer Fournier, Milford, MA (US)

(73) Assignee: Waters Technologies Corporation, Milford, MA (US)

( * ) Notice: Subject to any disclaimer, the term of this patent is extended or adjusted under 35 U.S.C. 154(b) by 579 days.

(21) Appl. No.: 12/595,344

(22) PCT Filed: Apr. 10, 2008

(86) PCT No.: PCT/US2008/059809
§ 371 (c)(1),
(2), (4) Date: Feb. 11, 2010

(87) PCT Pub. No.: WO2008/127949
PCT Pub. Date: Oct. 23, 2008

(65) Prior Publication Data

US 2010/0132799 A1 Jun. 3, 2010

Related U.S. Application Data

(60) Provisional application No. 60/911,542, filed on Apr. 13, 2007.

(51) Int. Cl.
*B01D 15/08* (2006.01)
*B01D 21/26* (2006.01)
*B04B 15/00* (2006.01)
*B65D 51/18* (2006.01)

(52) U.S. Cl. ........ 210/656; 210/787; 436/177; 436/178; 422/547; 215/247; 215/308; 137/1; 137/517

(58) Field of Classification Search .................. 210/656, 210/787; 436/177, 178; 422/547; 215/247, 215/308; 137/1, 571
See application file for complete search history.

(56) References Cited

U.S. PATENT DOCUMENTS

| | | | |
|---|---|---|---|
| 5,899,349 | A | 5/1999 | Moore |
| 2001/0041336 | A1 | 11/2001 | Anderson et al. |
| 2002/0130100 | A1 | 9/2002 | Smith |
| 2003/0052074 | A1 | 3/2003 | Chang et al. |
| 2005/0236066 | A1 | 10/2005 | Reinhardt et al. |
| 2006/0163162 | A1 | 7/2006 | Fisk et al. |

OTHER PUBLICATIONS

Written Opinion of the International Searching Authority for PCT/US2008/059809, mailed on Jul. 17, 2008.*
Supplementary European Search Report, forms 1503, PO459, 1703 and 1507S, completion date May 19, 2011.

* cited by examiner

*Primary Examiner* — David A Reifsnyder
(74) *Attorney, Agent, or Firm* — Waters Technologies Corp

(57) ABSTRACT

A device for limiting sample evaporation. The device has a vessel body having a body exterior surface and at least one body interior surface. The at least one body interior surface has one or more walls defining a first chamber, a second chamber and a conduit means. The first chamber has a first chamber opening for receiving at least one of the groups selected from a sample and a sample dispensing device. The first chamber opening defines the border of the body exterior surface and the body interior surface. The conduit means is in communication with the first chamber and the second chamber for receiving at least one of the group consisting of sample from said first chamber, a sample from a sample dispensing device and a sample dispensing device passing through or into the conduit means for placing the sample in the conduit means or into the second chamber. The second chamber is in communication with the conduit means for receiving and containing the sample from at least one of the group selected from the sample dispensing device and conduit means. The conduit means is arranged such that the sample in the second chamber is substantially isolated from the atmosphere to limit sample evaporation in the second chamber as the sample is contained therein.

43 Claims, 7 Drawing Sheets

VESSEL, DISPENSING DEVICES, KITS AND METHODS FOR CONTAINING FLUIDS

STATEMENT WITH RESPECT TO FEDERAL SPONSORSHIP

The present invention was made without Federal sponsorship or funds.

FIELD OF THE INVENTION

Embodiments of the present invention are directed to devices for transferring and holding fluids under atmosphere while minimizing fluid loss through evaporation.

BACKGROUND OF THE INVENTION

The following terms, defined below, will be used to describe embodiments of the present invention.

Chromatography is the science of separating compounds held in solution. The compounds are separated by flowing the solution through a stationary phase. Compounds held in the solution exhibit different affinity for the stationary phase and separate from each other. Common stationary phases are solids such as a packed bed of particles, beads, fibers, and structures known in the art as "porous monoliths". These solid stationary phases will be referred to herein as solid phase separation media, or simply, separation media.

Solid phase extraction devices are devices that use a solid stationary phase to perform a chromatographic separation. Common solid phase extraction devices include columns, cartridges and funnel-like devices which have one or more chambers containing a separation media. Particularly in the study of biological processes, it is desirable to work with small volumes. If the sample is obtained from a living organism, such small sample may not be as disruptive as a larger sample. Many biological samples can only be obtained in a small volume.

However, as fluid sample size decreases, the sample becomes increasing difficult to handle without losses. These losses may come from fluid retained on transferring devices such as solid phase extraction devices, pipettes, vials, conduits and cuvettes or evaporation. As used herein, the term "evaporation" refers to the change in phase of a liquid to a gas.

SUMMARY OF THE INVENTION

Embodiments of the present invention are directed to devices, kits and methods for performing fluid transfer operations and chromatography that limit loss of sample through evaporation.

One embodiment of the present invention is directed to a device for limiting sample evaporation. The device has a vessel body having a body exterior surface and at least one body interior surface. The at least one body interior surface has one or more walls defining a first chamber, a second chamber and a conduit means. The first chamber has a first chamber opening for receiving at least one of the group selected from a sample and a sample dispensing device. The first chamber opening defines the border of the body exterior surface and the body interior surface. The conduit means is in communication with the first chamber and the second chamber for receiving at least one of the group consisting of sample from said first chamber, a sample from a sample dispensing device and a sample dispensing device passing through or into the conduit means for placing the sample in the conduit means or into the second chamber. The second chamber is in communication with the conduit means for receiving and containing the sample from at least one of the group selected from the sample dispensing device and conduit means. The conduit means is arranged such that the sample in the second chamber is substantially isolated from the atmosphere to limit sample evaporation in the second chamber as the sample is contained therein.

As used herein the term "conduit means" is used to denote a tube, passageway, membrane or any other device that can substantially separate the first and second chamber in such a way to limit the flow of air from the atmosphere into the second chamber but not to prevent sample access to the second chamber, or extraction from the second chamber for further analysis For example, one conduit means has at least one conduit cross sectional area and the second chamber has a cross sectional area wherein the conduit means cross sectional area is less than the cross sectional area of the second chamber to limit the exchange of atmosphere between the second chamber and the first chamber. The "cross sectional area of the conduit means" refers to the area of a plane perpendicular to the flow of fluid through the conduit means. The "cross sectional area of the second chamber" refers to at least one volume of fluid in which the volume is associated with a fluid level in the second chamber and the plane defined by such level in the second chamber is at its widest point. A preferred second chamber is spherical, presenting a maximum area for a wetted surface.

And, as a further example, wherein the conduit means features a membrane, one embodiment features a membrane having a membrane opening. The membrane opening has a conduit cross sectional area. The second chamber is constructed and arranged to receive a fluid sample having at least one volume in which the at least one volume has a fluid level in the chamber and the fluid level in the second chamber defines a second chamber cross sectional area. The conduit means cross sectional area is equal to, and, more preferably, less than the cross sectional area of the second chamber to limit the exchange of atmosphere between the second chamber and said first chamber.

Further examples of preferred membranes are a permeable membrane, a membrane having a slit, membrane having opening formed by the force of the fluid, for example, upon centrifugation, or a membrane that forms an opening upon being pierced by a dispensing device.

Preferably, the vessel body is adapted and constructed to be received in a centrifuge to propel fluid to move from the first chamber through the conduit means and into the second chamber. The second chamber, substantially isolated from the atmosphere by the conduit means, limits evaporation and maintains the integrity of the sample.

A preferred embodiment of the device is constructed and arranged to receive sample from a sample dispenser. As used herein the term "sample dispenser" refers to a autosampler, pipette, needle, syringe, tip or other separate device for funnelling fluid samples. A preferred sample dispenser is an autosampler. Autosamplers are well known in the art and commonly employ a needle to withdraw or inject fluid samples.

Preferably, the first chamber opening and said first chamber receive a sample dispenser.

A preferred sample dispenser has a dispenser housing having a housing exterior surface, at least one housing interior surface, a first end and a second end. The interior surface and exterior surface define at least one housing inlet at the first end and at least one housing outlet at the second end. The interior wall between said housing inlet and the housing outlet defines a passage for conveying and holding sample for dispensing from the housing outlet.

Preferably, with automated systems, such as autosamplers, one embodiment of the present invention features conduit means and the first chamber receiving the dispenser housing with the housing outlet projecting into said second chamber.

Preferably, with tips and other small portable dispensing means, at least one of the sample dispenser and the vessel body have retaining surfaces to hold the sample dispenser and vessel body in position to place fluid sample into at least one of said first chamber, second chamber and conduit means.

A preferred retaining surface comprises a rim at the first chamber opening and at least one abutment ridge projecting outwardly from the dispenser housing which, in cooperation with the rim hold the sample dispenser in position.

A preferred sample dispenser is capable of performing chromatographic separations. One embodiment of the invention features a sample dispenser having a passage with at least one media section. The media section may be a solid phase extraction media through which fluid samples flow to effect a separation.

A preferred media section has a frusto-conical shape in which said media section towards said first end, the housing inlet, has a larger cross sectional area than said media section towards said second end, the housing outlet. Preferably, the media section has at least one frit element to retain the solid phase separation media. A preferred frit element is a porous sphere.

The sample dispenser with separation media can effect a chromatographic separation upon sample flowing through the passage from said housing inlet to the outlet. However, those skilled in the art will recognise that the sample dispenser can be used in the manner of a pipette tip to withdraw a fluid sample through the housing outlet by applying a vacuum to the housing inlet to effect a separation in the opposite direction.

Preferably, at least one of the dispenser or vessel body is adapted and constructed to be received in a centrifuge. One embodiment of the present invention features a dispenser housing and vessel body constructed to be received in a centrifuge. The dispenser housing receives a fluid sample and directs the fluid sample into the first chamber, conduit means or second chamber upon application of centrifugal force.

Preferably, the vessel body has at least one third chamber in fluid communication with or capable of being placed in fluid communication with said first chamber. The third chamber is arranged such that fluid in the third chamber will increase the level of saturation of the atmosphere in the first chamber, and hence to reduce the evaporation of the sample in the second chamber. A preferred third chamber surrounds said first chamber.

A further embodiment of the present invention features a vessel body and a plug element. The plug element is constructed and arranged to be received in the first chamber or the conduit means to close the second chamber from the atmosphere.

Embodiments of the present invention are also directed to a device for performing separations for use with a vessel having a vessel body. The vessel body has been described previously as having a body exterior surface and at least one body interior surface. The body interior surface has one or more walls defining one or more chambers and at least one of the one or more chambers has an opening. The dispenser has a dispenser housing having a housing exterior surface, at least one housing interior surface, a first end and a second end. At least one interior surface and exterior surface define at least one housing inlet at the first end and at least one housing outlet at the second end. The housing inlet, the housing outlet and the one interior wall define a passage for holding and/or conveying fluid sample for dispensing from said housing outlet. At least one of the sample dispenser and the vessel body have retaining surfaces to hold the sample dispenser and vessel body in position to place a fluid sample into at least one of the chambers of the vessel body and the dispenser housing and vessel body are subjected to centrifugal force.

Preferably, the retaining surfaces comprise a rim at the chamber opening and at least one abutment ridge projecting outwardly from the dispenser housing.

Preferably, the passage has at least one media section comprising a solid phase extraction media. A preferred media section has a frusto-conical shape in which said media section is towards said first end and has a larger cross sectional area than said media section towards said second end. And, preferably, the media section has at least one frit element. A preferred frit is a porous sphere.

A further embodiment of the present invention is directed to a kit for performing fluid transfers. The kit comprises a vessel body and a dispenser housing as previously described. As used herein, the term "kit" refers to an assembly of parts packaged or bundled for a common purpose. Such kits may include instructions for the use of the item and other parts and supporting equipment.

Preferably, at least one of the dispenser housing and the vessel body is adapted and constructed to be received in a centrifuge.

Preferably, the kit comprises a plug element for sealing the second chamber from said first chamber.

Preferably, the vessel body, dispenser housing and plug element, if so equipped, has indicia to link each with each other. Such indicia has value for quality control, to ensure fluid samples from one dispenser housing, or plug element, intended for one vessel body do not end up in the wrong vessel body.

Preferably, one or more elements of the kit are linked by tethers, for example, without limitation, monofilament lines. For example, without limitation, one embodiment of the present invention features a tether between the plug element and the vessel body. In the event the tether is not desired, the tether can be readily clipped.

A further embodiment of the present invention is directed to a method of transferring and/or containing a fluid sample under conditions which limit evaporation. The method comprises the step of providing a vessel body having a body exterior surface and at least one body interior surface. At least one body interior surface has one or more walls defining a first chamber, a second chamber and a conduit means. The first chamber has a first chamber opening for receiving at least one of the group selected from a sample and a sample dispensing device. The first chamber opening defines the border of the body exterior surface and the body interior surface. The conduit means is in communication with the first chamber and the second chamber for receiving at least one of the group consisting of sample from the first chamber, a sample from a sample dispensing device and a sample dispensing device passing through or into the conduit means for placing the sample in the conduit means or into the second chamber. And, the second chamber is in communication with the conduit means for receiving and containing the sample from at least one of the group selected from said sample dispensing device and conduit means. The conduit means is arranged such that said sample in said second chamber is substantially isolated from the atmosphere to limit sample evaporation in the second chamber as the sample is contained therein. The method further comprising the step of placing a fluid sample in at least one of said first chamber, conduit means and second chamber.

Preferably, the method comprises the step of centrifuging the vessel body to move fluid into the second chamber.

Thus, embodiments of the present invention are directed to devices, apparatus, kits and methods providing sample evaporation limiting devices with a conduit means arranged to substantially isolate samples from the atmosphere. These and other benefits will be apparent to those individuals skilled in the arts upon viewing the drawings and reading the detailed description.

DETAILED DESCRIPTION OF THE DRAWINGS

Embodiments of the invention will be described with respect to sample preparation for chemical analysis with the understanding that the invention has broad application in other fields as well.

Figure 1:
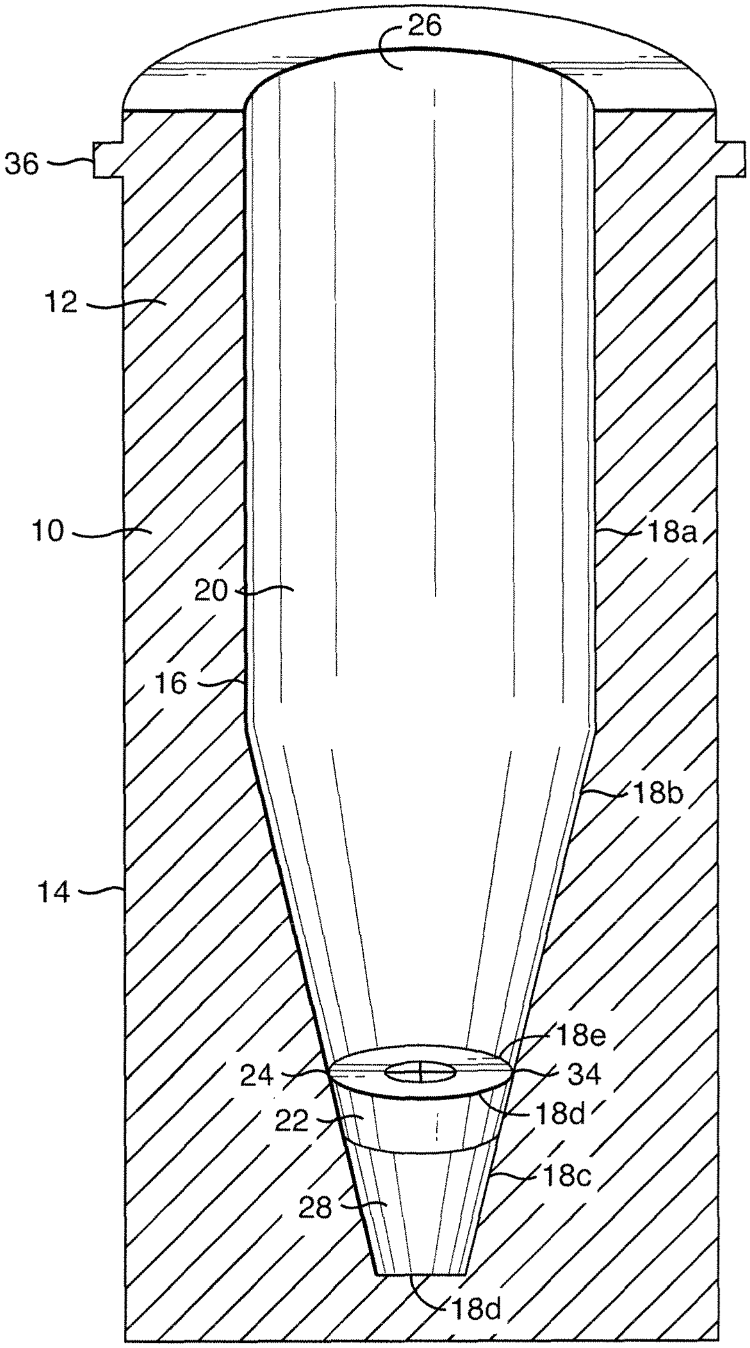
FIG. 1 depicts an apparatus in accordance with the invention

Turning now to FIG. 1, such figure depicts in cross section an apparatus, generally designated by the numeral 10, for use with a standard laboratory centrifuge [not shown]. Standard laboratory centrifuges are known in the art and are available from several vendors.

The apparatus comprises a vessel body (12) having a body exterior surface (14) and at least one body interior surface (16). The body interior surface has one or more walls, such as walls (18*a* and 18*b*) defining a first chamber (20), walls (18*c* and 18*d*) defining a second chamber (22) and walls (18*e* and 180 defining a conduit means (24).

The first chamber (20) has a first chamber opening (26) for receiving a sample (28). The first chamber opening (26) defines the border of the body exterior surface (14) and the body interior surface (16).

The body (12) is made of fused silica, glass, plastic or metal. Preferred plastics are selected from one or more thermoplastics currently available as exemplified in the text *Modern Plastics Handbook*, Charles A Harper, editor; McGraw-Hill (2005). Preferred plastics comprise polyethylethelketone, sold under the trademark PEEK™ (Dupont), Polyfluoroalkyl polymers sold under the trademark TEFLON® (Dupont) and PTFE, polyimide polymers, polyamide imide polymers, polyethylene polymers, polyvinylindene fluoride polymers, polychlorofluoroalkyl polymers, known in the trade as PCTFE.

The sample (28) is depicted as having entered the first chamber (20) through the first chamber opening (26), passing the conduit means (24) and resting in the second chamber (22). As used herein, the term “sample” refers to any material which is subject to evaporative processes. By way of example, without limitation, the sample may comprise fluids, liquids, gels, suspensions, solutions, and material of biological origin such as tissues, blood, plasma, urine, cerebral spinal fluid, sputum and others.

Sample (28) may also be placed in device (10) by means of a sample dispensing device [not shown], such as a needle, syringe, pipette, micropipette, dropper and the like, known in the art. The sample dispensing device may be manually operated or part of a larger instrument such as an autosampler [not shown]. Autosamplers are available from several vendors as individual instruments and as integrated components, for example, the ALLIANCE® separations module, sold by Waters Corporation (Milford, Mass., USA) comprises an autosampler with a chromatography system.

The conduit means (24) is in communication with the first chamber (20) and the second chamber (22). The conduit means is for receiving the sample (28) or a sample dispensing device [not shown]. The sample may come from the first chamber (20), or from a sample dispensing device. Or, conduit means (24) receives a sample dispensing device passing through or into the conduit means (24) for placing the sample (28) in the conduit means (24) or into the second chamber (22).

As depicted in FIG. 1, conduit means (24) is a membrane (32). Membrane (32) has an opening (34) or features which will create an opening (34). For example, the membrane (32) may be scored to create an opening (34) upon pressure from a fluid during centrifugation. In the alternative, the membrane (32) may cooperate with dispensing means such as a needle to allow piercing. A preferred opening is a slit. Upon addition of sample (28), the membrane (32) deforms under the weight of a droplet of sample that is resting against it, allowing the droplet to fall into the second chamber (22). Once the droplet descends, the slit closes or partially closes.

The membrane (32) is preferably made of a material exhibiting elastic characteristics, such as a material selected from one or more thermoplastics currently available as exemplified in the text *Modern Plastics Handbook*, Charles A Harper, editor; McGraw-Hill (2005). These materials have been discussed with respect to the body (12).

Those skilled in the art will readily recognise that the membrane (32) can have a plurality of holes or openings [not shown] in a manner known in the art to form a permeable membrane or a breakable membrane. Membranes having features of permeability or capable of breaking or tearing are preferably made of plastics as previously described or foils such as aluminium.

As depicted in FIG. 1, the membrane (32) has a membrane opening (34) or such opening is made as previously described by needles or the force of the fluid held in the first chamber (20). The membrane opening (34) has a conduit cross sectional area that is smaller than the cross sectional areas of the first chamber (20) and second chamber (22) adjoining the conduit means (24).

Figure 2:
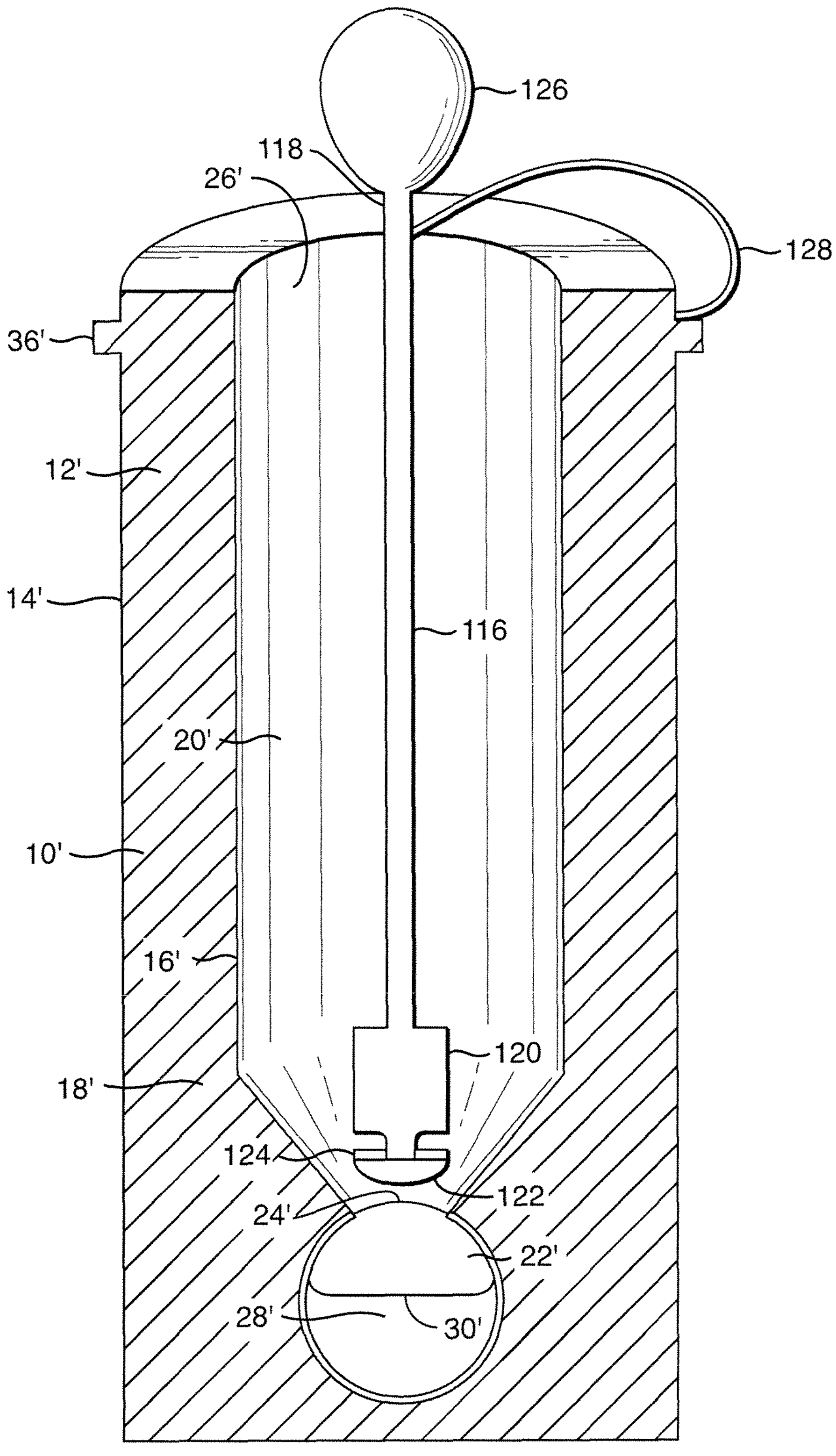
FIG. 2 depicts an alternative embodiment of the invention

Turning now to FIG. 2, a device (10') is depicted in which similar features as described with respect to device (10) of FIG. 1 bear identical numbers with a prime designation. The conduit means (24') is depicted as a single opening. The second chamber (22') is constructed and arranged to receive a fluid sample (28') having at least one volume which has a fluid level (30'). The fluid level (30') in the second chamber (22') defines a second chamber cross sectional area. The conduit means (24') cross sectional area is less than or equal to the second chamber cross sectional area to limit the exchange of atmosphere between said second chamber (22') and said first chamber (20'). Preferably, the conduit means (24') is 10 to 90 percent of the second chamber cross sectional area at the predetermined volume.

Figure 3:
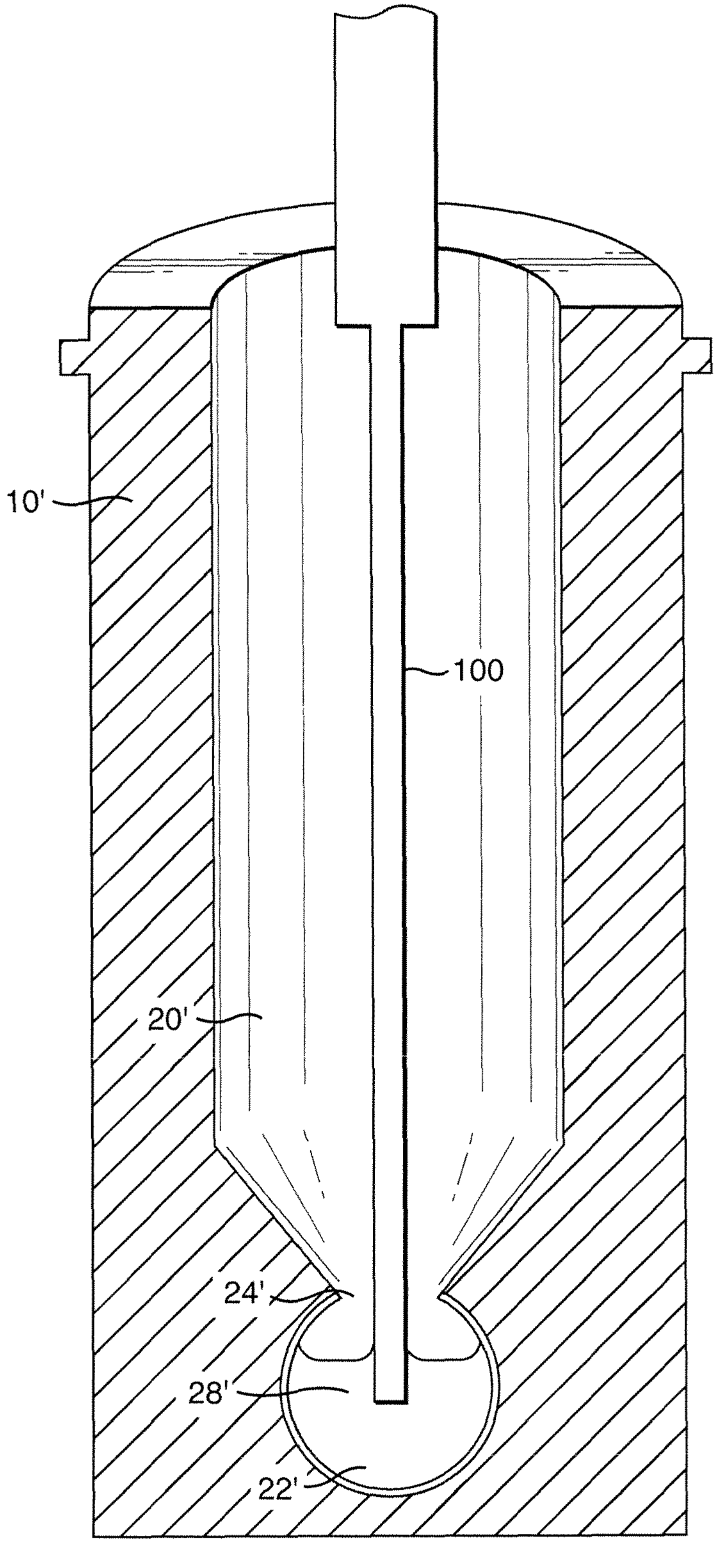
FIG. 3 depicts an embodiment of the invention with a sample dispensing device

Turning now to FIGS. 1 and 2, the second chamber (22 and 22') is in communication with the conduit means (24 and 24') for receiving and containing the sample (28 and 28') descending from or through conduit means (24 and 24'). Or, as depicted in FIG. 3, from a sample dispensing device, generally designated as (100). Sample dispensing device (100) is depicted as a needle (110) in communication with a source of sample [not shown]. Needle (110) can be a part of a manual pipette device or an automated sample dispensing device such as a autosampler [not shown].

Returning now to FIGS. 1 and 2, the conduit means (24 and 24') is arranged such that the sample (28 and 28') in the second chamber (22 and 22') is substantially isolated from the atmosphere to limit evaporation of sample (28 and 28') in the second chamber (22 and 22').

Focusing on FIG. 2, device (10') has a plug element (116) comprising a handle (118) and an end plug (120) to facilitate containment and isolation of a sample (28'). End plug (120) has a tab element (122) that is received in the opening comprising conduit means (24'). The tab element (122) has a snap ridge (124) with is cooperates with the conduit opening (24') to hold the plug element (116) in place by a snap fit.

The handle (118) has a finger grip section (126) to facilitate handling the plug element (116). The length of the handle (118) can protrude above the first chamber opening (26') or be recessed within the first chamber (20') to allow the vessel body (12') to be stacked. A tether (128) holds the plug element (116) to the vessel body (12'). The plug element (116) is made from one or more materials selected from the group comprising glass, fused silica, plastic and metals. Plastic materials allow the tether (128) to be clipped if the plug element (116) is not desired.

Turning now to FIGS. 1 and 2, each vessel body (12 and 12') is adapted and constructed to be received in a centrifuge [not shown] to propel fluid to move from the first chamber (20 and 20') through the conduit means (24 and 24') and into the second chamber (22 and 22'). Centrifuges typically have circular holes in which vials and cuvettes are received. The exterior surface (14 and 14') of each vessel body (12 and 12') cooperates with the dimensions of the opening of the centrifuge to allow the device (10 and 10') to be received therein.

The exterior surface (14 and 14') of devices (10 and 10') have one or more retention protrusions (36 and 36'). As illustrated, the retention protrusion (36 and 36') is a ring having a diameter that exceeds the diameter of the opening such that the device (10 and 10') rests in the opening by such retention protrusion (36 and 36').

Figure 4:
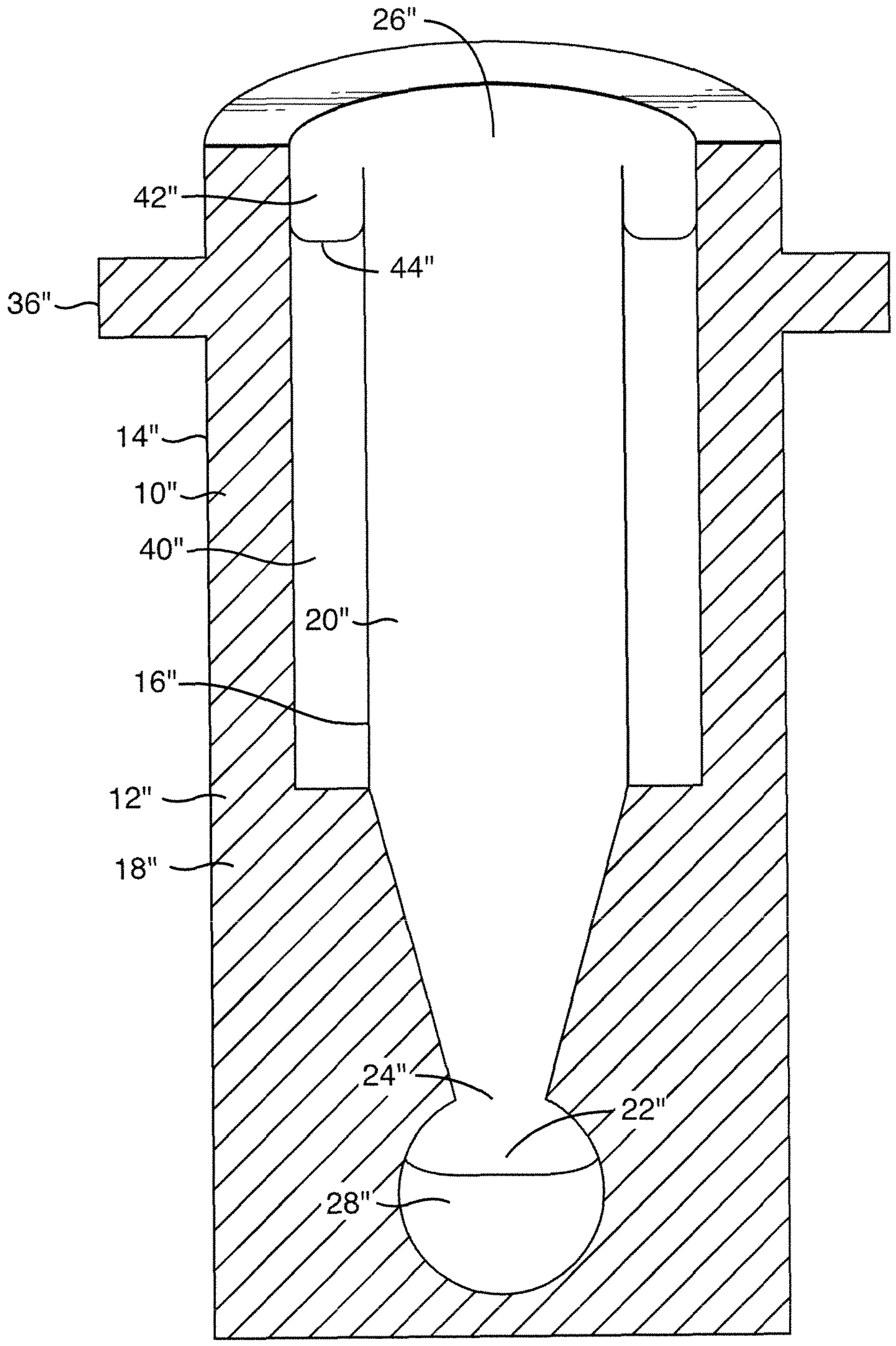
FIG. 4 depicts a further embodiment of the invention

Turning now to FIG. 4, a device (10") is depicted in which similar features as described with respect to device (10) of FIG. 1 bear identical numbers with a double prime designation. The vessel body (12") has at least one third chamber (40") in fluid communication with or capable of being placed in fluid communication with the first chamber (20"). As depicted, vessel body (12") has at least one third chamber opening (42") for addition of fluid (44") and for placing the third chamber in communication with the first chamber (20"). As depicted, third chamber (40") surrounds the first chamber (22").

The third chamber (40") is arranged such that fluid (44") in the third chamber (40") will increase the level of saturation of the atmosphere in the first chamber (20"), and hence to reduce the evaporation of the sample (28") in the second chamber (22"). Preferably, the further fluid to be added to the third chamber (40") is a solvent present in the sample (28").

Those skilled in the art will recognize that multiple third chambers [not shown] for a plurality of fluids can be incorporated in the device in the manner of the single third chamber (40").

Figure 5:
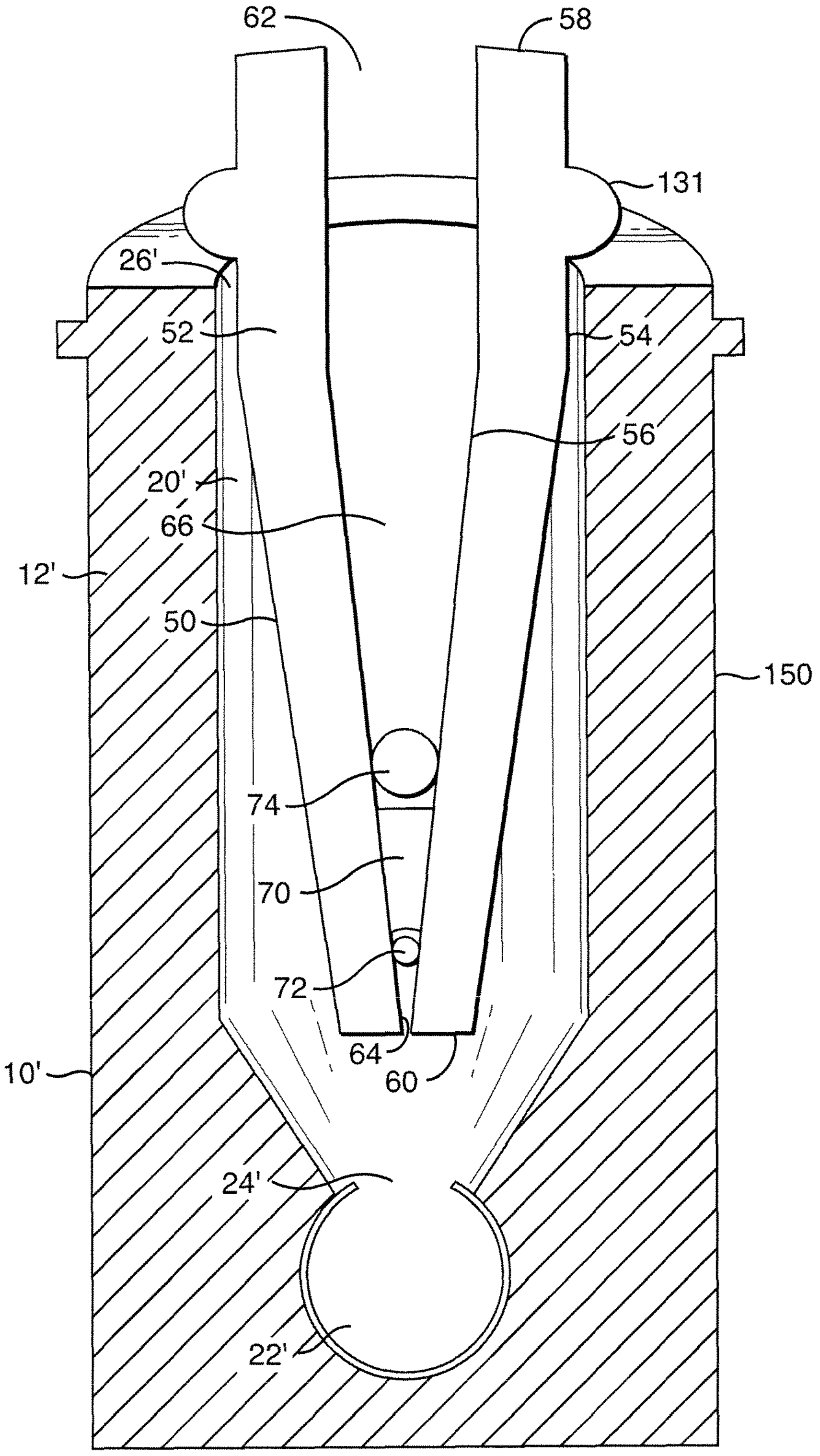
FIG. 5 depicts an embodiment of the invention engaged to a dispenser

Turning now to FIG. 5, as depicted, vessel body (12') is engaged with a dispenser (50). Dispenser (50) has a dispenser housing (52) having a housing exterior surface (54), at least one housing interior surface (56), a first end (58) and a second end (60). The dispenser is made of materials described with respect to the vessel body (12).

The interior surface (56) and exterior surface (54) define a housing inlet (62) and a housing outlet (64). The housing inlet (62) is at the first end (58) and the housing outlet (64) is at the second end (60). The interior surface (56) between the housing inlet (62) and the housing outlet (64) defines a passage (66) for holding sample. The sample is discharged from the housing outlet (64).

The sample dispenser (50) and the vessel body (12') have retaining surfaces to hold the sample dispenser (50) and vessel body (12') in position to place sample into at least one of the first chamber (20'), second chamber (22') and conduit means (24'). As depicted, the first chamber (20') receives the dispenser housing (52) with the at least one housing outlet (64) projecting into the first chamber (20'). Sample may be discharged from the housing outlet into the conduit means (24') or the second chamber (22') by providing a longer sample dispenser 50 at the housing outlet 64.

The retaining surfaces, as depicted, comprise the rim (126) at the first chamber opening (26') and at least one abutment ridge (131) projecting outwardly from the dispenser housing (52). Those skilled in the art will recognize that the cooperating retaining surfaces can be reversed, that is, the first chamber (20') would have on or more inwardly projecting ridges [not shown] which support the dispenser (50) on the housing exterior surface (54). The dispenser housing (50) and the vessel body (12').

Preferably the passage (66) has at least one media section (70) comprising a solid phase extraction media. Solid phase extraction can be used to purify samples prior to analysis, i.e., to isolate a desired target substance from an interfering substance in a sample medium. An advantage of using the present invention is that it allows the use of smaller elution volume solid phase extraction devices. Solid phase extraction media comprise packed beds of particles, beads, or fibers or monolithic porous materials. These materials are formed of organic and inorganic compositions well known in the art.

The media section (70) has a frusto-conical shape in which the media section (70) towards said first end (58) and has a larger cross sectional area than said media section towards said second end (60). The frusto-conical shape facilitates use of a first porous sphere (72) and a second porous sphere (74) as a bottom frit element and a top frit element, respectively, to retain the media in the media section (70). However, those skilled in the art will recognize that other frit elements such as screens and porous foils and membranes can be readily substituted for the porous spheres (72) and (74).

The dispenser (50) and vessel body (12') are constructed and arranged to be received in a centrifuge as an combined assembly (150). The relative centrifugal force placed on an individual vessel body (12, 12', 12") or dispenser (50) or combined assembly (150) can be calculated using the formula $$RCF = 1.12\gamma\left(\frac{RPM}{1000}\right)^2$$

Where r is the radius of rotation of the sample in mm, and RPM is the number of revolutions that the centrifuge arm will make in 1 minute. It is normally expressed as a multiple of g (gravity in metres per second)

The ideal relative centrifugal force for any sample is dependent upon the viscosity of the sample; The more viscous the sample, the higher the ideal relative centrifugal force. Centrifugation is particularly desirable as the force for powering the sample through a dispenser (50) and/or a vessel body (12, 12' or 12"). Centrifugal force does not induce evaporation of the sample like in vacuum extraction, thus allowing smaller quantities of sample to be used.

Preferably the centrifuge applies a relative centrifugal force of between 200×g $m/s^2$ and about 10×g $m/s^2$.

The dispenser housing (52) receives a sample on the second frit (74). Application of centrifugal force propels the sample through the second frit, into and through the separation media (70), into and through the first frit (72). The sample is discharged from the dispenser (50) at housing outlet (64).

Figure 6:
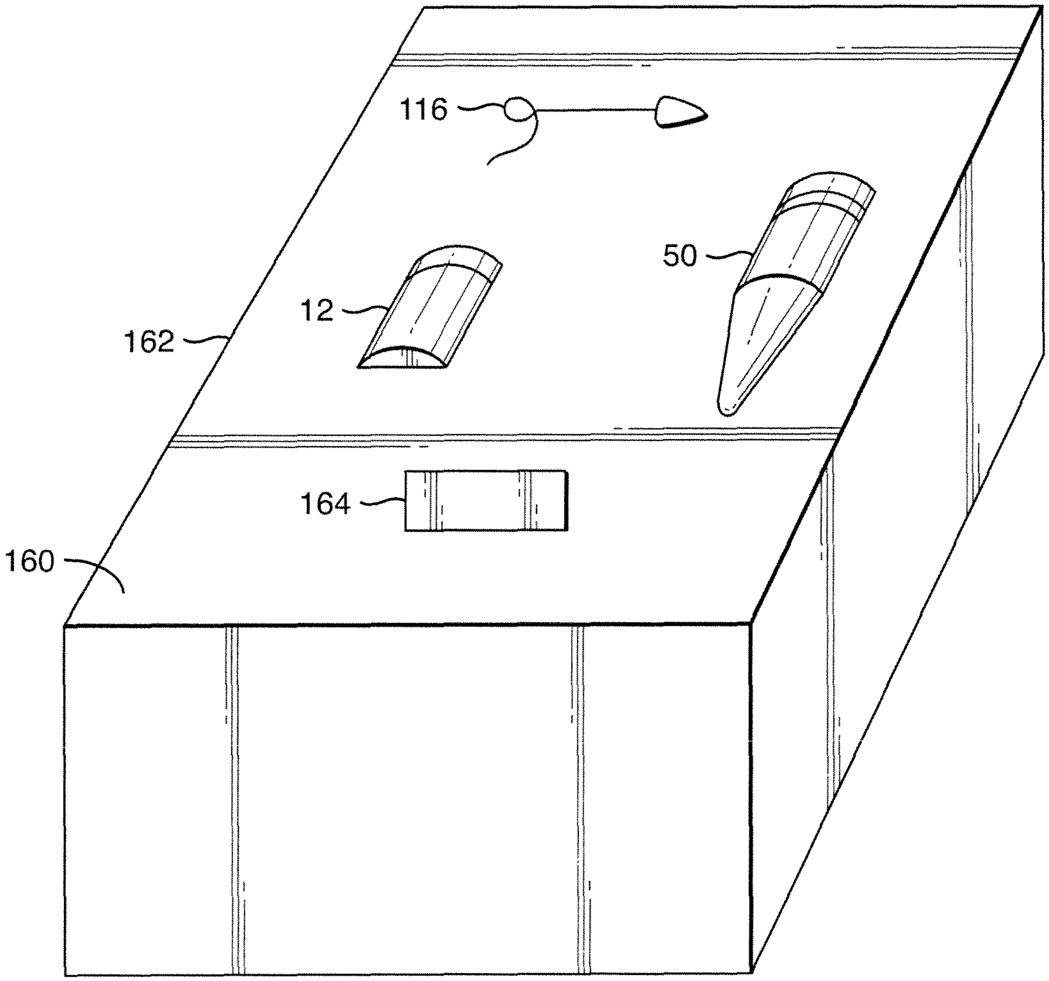
FIG. 6 depicts an embodiment of the invention as a kit

The sample is discharged in the first chamber (20') of the vessel body (12'), through conduit means (24'), and into the second chamber (22'). Sample held in second chamber (22') is substantially isolated from the atmosphere due to the small diameter of the conduit means (24'). Thus, evaporation of the sample is minimised. Evaporation can be further minimized by insertion of a plug element (116) as depicted in FIG. 2. Sample Evaporation can be further limited by the liquid from the third chamber (40") evaporating to increase the content of solvent in the atmosphere in the first chamber (20') and hence also the second chamber (22') of the apparatus. Turning now to FIG. 6, one or more of the dispenser (50), vessel body (12), and plug element (116) are depicted as a kit (160) for performing separations or for storing samples. The kit comprises suitable packaging, such as box (162). Other suitable packaging comprises wraps, bags, plastic shells and the like. Kit (160) comprises instructions (164) for the use of dispenser (50), vessel body (12) and plug element (116). Of course, any of the vessel bodies (12, 12' and 12") can be substituted in the kit.

Preferably the apparatus (10) is designed such that the second chamber (22) can hold a volume of sample (28) between approximately 100 µl and 1 ml. A typical vessel body (12) may be of length in the range of 1-10 cm, preferably in the range 2-5 cm. The diameter of a typical vessel body (12) may be between 2 mm and 30 mm, preferably in the range 5-15 mm at the first chamber opening (26).

A typical dispenser (50) may be of length 1-10 cm, preferably in the range from 2-5 cm. A dispenser (50) may have a diameter between 5 mm and 50 mm, preferably in the range 10-30 mm at the first end (58). The dispenser (50) may have a diameter in the range 100 µm-2 mm, preferably in the range 200 µm to 1 mm at the second end (60).

EXAMPLE

The dispenser (50) was made by manually packing a dispenser housing (52) using 1.0±0.05 mg of 30 µm Oasis® HLB (Waters Corporation) contained between two polyethylene spherical frits: a 0.035" spherical frit at the bottom of the bed and a 0.055" spherical frit at the top of the bed.

Sodium chloride, Angiotensin II, and p-toluamide were obtained from Sigma-Aldrich. Triethylamine (TEA), glacial acetic acid, trifluoroacetic acid (TFA), and HPLC grade acetonitrile were obtained from J. T. Baker. 15-mer oligodeoxythymidine (15-mer oligo T) was obtained from Midland Certified Reagent Company (Midland Texas). 0.1 M triethylammonium acetate (TEAAc) was prepared by adding 2.21 mL of glacial acid and 5.58 mL of triethylamine to 350 mL of H2O. The solution was mixed, adjusted to a volume of 400 mL and pH adjusted to pH 7 using acetic acid. The 0.24% TFA, and 50% acetronitrile were prepared by volume. 50 mM NaCl was prepared by adding 0.0584 grams of NaCl to 1 liter of H2O. 0.1 M TEAAc with 50 mM NaCl was prepared by adding 2.21 mL of glacial acid and 5.58 mL of triethylamine to 350 mL of 50 mM NaCl. The solution was mixed, adjusted to a volume of 400 mL with 50 mM NaCl and pH adjusted to pH 7 using acetic acid. A 60 µL DNA load sample contained 1 µg of 15-mer oligo T and 1 µg of p-toluamide in the 0.1 M TEAAc buffer with 50 mM NaCl. The 60 µL peptide load sample contained 1 µg of Angiotensin II and 1 µg of p-toluamide in the 0.24% TFA. All solutions were pulled through the dispenser 50 using a centrifuge.

DNA Desalting Method:

1. Condition each dispenser (n=3) with 60 µL of acetonitrile followed by 60 µL of 0.1 M TEAAc buffer
2. Load 60 µL/dispenser of the DNA sample
3. Wash with 60 µL/dispenser of the 0.1 M TEAAc buffer followed by 60 µL/tip of H2O
4. Elute each dispenser with 5 µL of 50% acetonitrile in H2O Peptide Method:

1. Condition each dispenser (n=4) with 60 µL of acetonitrile followed by 60 µL of 0.24% TFA
2. Load 60 µL/tip of the peptide sample
3. Wash with 20 µL of the 0.24% TFA followed by 20 µL of H2O
4. Elute each tip with 5 µL of 50% acetonitrile in H2O Vessel body (12) has been loaded with sample (28) which has been stored in the second chamber (22).

A needle is placed through the first chamber (20) and the conduit (24) and into the second chamber (22) in order to pick up sample from the second chamber (22) and pass it on for further analysis.

A person skilled in the art would appreciate that the needle may be a hypodermic or a silica capillary with negative pressure, amongst many others.

A person skilled in the art would appreciate that the further analysis may be performed in a mass spectrometer, A liquid chromatograph, a NMR spectrometer, Ramon Spectrometer, an IR spectrometer, a UV spectrometer, surface plasmon resonance, DNA, antibody or protein microchip analysis amongst others.

Experimental

An experiment to test the relative time taken for a solvent to evaporate was performed comparing a standard vial to a vessel body (12).

Figure 7:
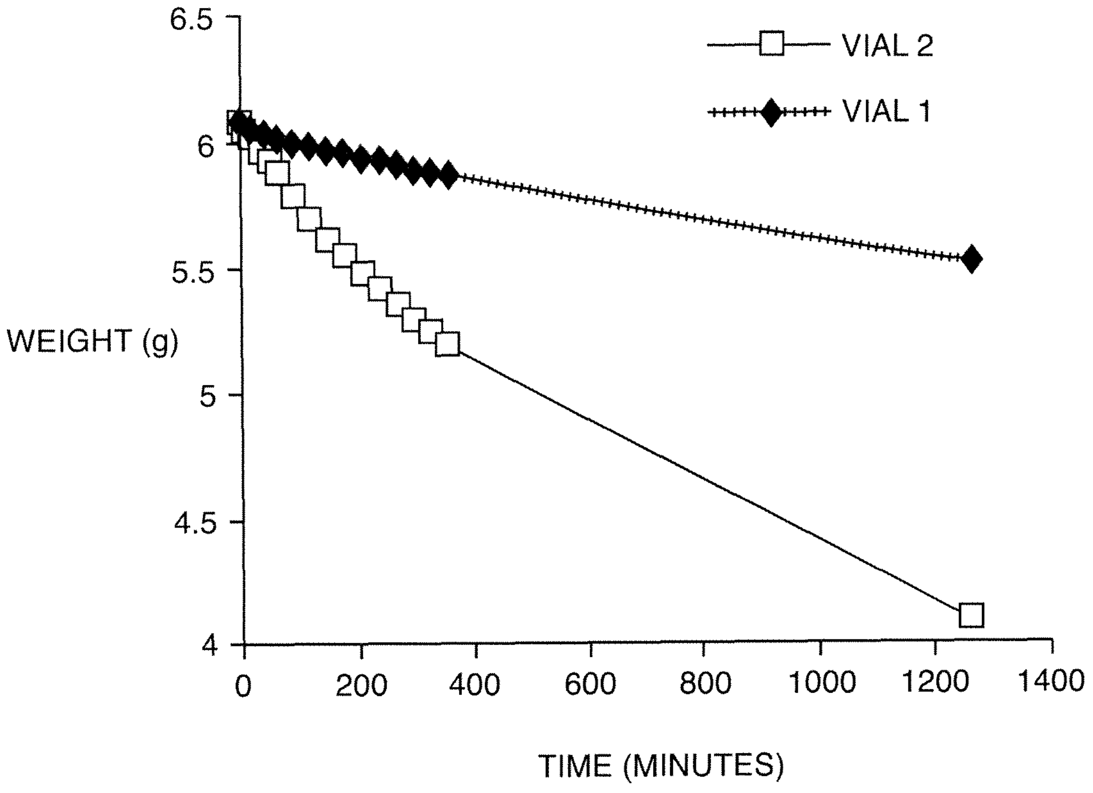
FIG. 7 depicts a graph of weight against time for an apparatus substantially in accordance with the invention and a standard vial container

FIG. 7 shows a graph of the relative weights of the two vials against the time for which they have been standing.

Vial 1 is a vessel body (12) substantially as described previously. Vial 2 is a standard vial container.

The "vials" were filled with ~2 mL of methanol (b.p. 65 C) and placed onto analytical balances (enclosed compartment, room temperature 22 C).

The loss of methanol due to evaporation was measured by weighting. The evaporation from vessel body (12) was significantly lower at all times.

Thus, we have described embodiments of the present invention that are preferred with the understanding that the invention is subject to modification and alterations that encompass the invention. Therefore, the present invention should not be limited to the precise details herein but should encompass the subject matter of the following claims and their equivalents.

What is claimed:

1. A device for containing a fluid sample under conditions which limit evaporation comprising:

a vessel body having a body exterior surface and at least one body interior surface, said at least one body interior surface having one or more walls defining a first chamber, a second chamber and a conduit means, said first chamber having a first chamber opening for receiving at least one of the group selected from a sample and a sample dispensing device, said first chamber opening defining the border of said body exterior surface and said body interior surface;

said conduit means in communication with said first chamber and said second chamber for receiving at least one of the group consisting of sample from said first chamber, a sample from a sample dispensing device and a sample dispensing device passing through or into said conduit means for placing said sample in said conduit means or into said second chamber;

said second chamber in communication with said conduit means for receiving and containing said sample from at least one of the group selected from said sample dispensing device and conduit means, wherein said conduit means is arranged such that said sample in said second chamber is substantially isolated from the atmosphere to limit sample evaporation in said second chamber as said sample is contained therein; and, Wherein said first chamber has a first chamber volume and said second chamber has a second chamber volume and said first chamber volume is greater than said second chamber volume.

2. The device of claim 1 wherein said conduit means has at least one conduit cross sectional area and said second chamber is constructed and arranged to receive a fluid sample having at least one volume in which said at least one volume has a fluid level in said second chamber and said fluid level in said second chamber defines a second chamber cross sectional area, said conduit means cross sectional area is less than said cross sectional area of said second chamber cross sectional area to limit the exchange of atmosphere between said second chamber and said first chamber.

3. The device of claim 1 wherein said conduit means comprises a membrane.

4. The device of claim 3 wherein said membrane is permeable.

5. The device of claim 1 wherein said conduit means comprises a membrane having a membrane opening.

6. The device of claim 5 wherein said membrane has a membrane opening and said membrane opening has a conduit cross sectional area and said second chamber is constructed and arranged to receive a fluid sample having at least one volume in which said at least one volume has a fluid level in said second chamber and said fluid level in said second chamber defines a second chamber cross sectional area, said conduit means cross sectional area is less than or equal to said second chamber cross sectional area to limit the exchange of atmosphere between said second chamber and said first chamber.

7. The device of claim 5 wherein said membrane opening is a slit.

8. The device of claim 5 wherein said membrane opening is formed upon centrifugation.

9. The device of claim 5 wherein said membrane opening is formed upon the insertion of a dispensing device.

10. The device of claim 1 wherein said vessel body is adapted and constructed to be received in a centrifuge to propel fluid to move from said first chamber through said conduit means and into said second chamber.

11. The device of claim 1 wherein said first chamber opening and said first chamber receive a sample dispenser.

12. The device of claim 11 wherein said sample dispenser has a dispenser housing having a housing exterior surface, at least one housing interior surface, a first end and a second end, said at least one interior surface and exterior surface defining at least one housing inlet and at least one housing outlet, said housing inlet at said first end and said housing outlet at said second end, said at least one interior surface between said housing inlet and said housing outlet defining a passage for holding sample for dispensing from said housing outlet.

13. The device of claim 12 wherein said conduit means and said first chamber receives said dispenser housing with said at least one housing outlet projecting into said second chamber.

14. The device of claim 12 wherein said passage has at least one media section comprising a solid phase extraction media.

15. The device of claim 14 wherein said media section has a frusto-conical shape in which said media section is towards said first end and has a larger cross sectional area than said media section towards said second end.

16. The device of claim 15 wherein said media section has at least one frit element.

17. The device of claim 16 wherein said frit element is a porous sphere.

18. The device of claim 11 wherein at least one of said sample dispenser and said vessel body have retaining surfaces to hold said sample dispenser and vessel body in position to place sample into at least one of said first chamber, second chamber and conduit means.

19. The device of claim 18 wherein said retaining surfaces comprise a rim at the first chamber opening and at least one abutment ridge projecting outwardly from the dispenser housing.

20. The device of claim 11 wherein at least one of said dispenser or said body is adapted and constructed to be received in a centrifuge.

21. The device of claim 11 wherein said dispenser and said vessel body are constructed to be received in a centrifuge, said dispenser housing receiving a sample and directing said sample into at least one of the group selected from said first chamber, conduit means and second chamber upon application of centrifugal force.

22. The device of claim 1 wherein said vessel body has at least one third chamber in fluid communication with or capable of being placed in fluid communication with said first chamber.

23. The device of claim 22 wherein said third chamber surrounds said first chamber.

24. The device of claim 1 further comprising a plug element said plug element constructed and arranged to be received in said first chamber or said conduit means to close said second chamber from the atmosphere.

25. A kit for performing fluid transfers comprising: a vessel body and a dispenser housing, said vessel body having an body exterior surface and at least one body interior surface, said at least one body interior surface having one or more walls defining a first chamber, a second chamber and a conduit means, said first chamber having a first chamber opening for receiving at least one of the group selected from a sample and a sample dispensing device, said first chamber opening defining the border of said body exterior surface and said body interior surface;

said conduit means in communication with said first chamber and said second chamber for receiving at least one of the group consisting of sample from said first chamber, a sample from a sample dispensing device and a sample dispensing device passing through or into said conduit means for placing said sample in said conduit means or into said second chamber; and, said second chamber in communication with said conduit means for receiving and containing said sample from at least one of the group selected from said sample dispensing device and conduit means, wherein said conduit means is arranged such that said sample in said second chamber is substantially isolated from the atmosphere to limit sample evaporation in said second chamber as said sample is contained therein;

wherein said first chamber has a first chamber volume and said second chamber has a second chamber volume and said first chamber volume is greater than said second chamber volume; and, said dispenser housing having a housing exterior surface, at least one housing interior surface, a first end and a second end, said at least one interior surface and exterior surface defining at least one housing inlet and at least one housing outlet, said housing inlet at said first end and said housing outlet at said second end, said at least one interior wall between said housing inlet defining a passage for holding sample for dispensing from said housing outlet, wherein at least one of said sample dispenser and said vessel body have retaining surfaces to hold said sample dispenser and vessel body in position to place sample into at least one of said first chamber, second chamber and conduit means as said housing outlet is placed in at least one chamber of said vessel body and the dispenser housing and vessel body are subjected to centrifugal force.

26. The kit of claim 25 wherein at least one of said dispenser housing or said vessel body is adapted and constructed to be received in a centrifuge.

27. The kit of claim 25 further comprising a plug element said plug element constructed and arranged to be received in said first chamber or said conduit means to close said second chamber from the atmosphere.

28. A method of containing a fluid sample under conditions which limit evaporation comprising the step of:

providing a vessel body having an body exterior surface and at least one body interior surface, said at least one body interior surface having one or more walls defining a first chamber, a second chamber and a conduit means, said first chamber having a first chamber opening for receiving at least one of the group selected from a sample and a sample dispensing device, said first chamber opening defining the border of said body exterior surface and said body interior surface;

said conduit means in communication with said first chamber and said second chamber for receiving at least one of the group consisting of sample from said first chamber, a sample from a sample dispensing device and a sample dispensing device passing through or into said conduit means for placing said sample in said conduit means or into said second chamber; and, said second chamber in communication with said conduit means for receiving and containing said sample from at least one of the group selected from said sample dispensing device and conduit means, wherein said conduit means is arranged such that said sample in said second chamber is substantially isolated from the atmosphere to limit sample evaporation in said second chamber as said sample is contained therein;

wherein said first chamber has a first chamber volume and said second chamber has a second chamber volume and said first chamber volume is greater than said second chamber volume; and, placing a fluid sample in at least one of said first chamber, conduit means and second chamber.

29. The method of claim 28 wherein said conduit means has at least one conduit cross sectional area and said second chamber is constructed and arranged to receive a fluid sample having at least one volume in which said at least one volume has a fluid level in said second chamber and said fluid level in said second chamber defines a second chamber cross sectional area, said conduit means cross sectional area is less than said cross sectional area of said second chamber cross sectional area to limit the exchange of atmosphere between said second chamber and said first chamber.

30. The method of claim 28 wherein said conduit means comprises a membrane.

31. The method of claim 30 wherein said membrane has a membrane opening and said membrane opening has a conduit cross sectional area and said second chamber is constructed and arranged to receive a fluid sample having at least one volume in which said at least one volume has a fluid level in said chamber and said fluid level in said second chamber defines a second chamber cross sectional area, said conduit means cross sectional area is less than or equal to said cross sectional area of said second chamber cross sectional area to limit the exchange of atmosphere between said second chamber and said first chamber.

32. The method of claim 30 wherein said membrane is permeable.

33. The method of claim 30 wherein said membrane opening is a slit.

34. The method of claim 30 wherein said membrane opening is formed upon centrifugation and said method comprises the step of placing said vessel body in a centrifuge and subjecting said vessel body to centrifugal forces to create said membrane opening and move said fluid sample into said second chamber.

35. The method of claim 30 wherein said membrane opening is formed upon the insertion of a dispensing device and said method further comprises the step of forming said membrane opening by inserting a dispensing device through said membrane and placing a fluid sample in said second chamber.

36. The method of claim 28 wherein said vessel body is adapted and constructed to be received in a centrifuge to propel fluid to move from said first chamber through said conduit means and into said second chamber and said method comprises the step of placing said vessel body in a centrifuge and subjecting said vessel body to centrifugal forces to move said fluid sample into said second chamber.

37. The method of claim 28 wherein said first chamber opening and said first chamber receive a sample dispenser.

38. The method of claim 37 wherein said sample dispenser has a dispenser housing having a housing exterior surface, at least one housing interior surface, a first end and a second end, said at least one interior surface and exterior surface defining at least one housing inlet and at least one housing outlet, said housing inlet at said first end and said housing outlet at said second end, said at least one interior wall between said housing inlet defining a passage for holding sample for dispensing from said housing outlet, said method comprises the step of dispensing said fluid sample into at least one of said first chamber, conduit means and second chamber through said passage.

39. The method of claim 38 wherein said conduit means and said first chamber receives said dispenser housing with said at least one housing outlet projecting into said second chamber.

40. The method of claim 38 wherein at least one of said dispenser housing and said vessel body have retaining surfaces to hold said dispenser housing and vessel body in position to place sample into at least one of said first chamber, second chamber and conduit means, said method comprising the step of fitting said dispenser housing and vessel body together as an assembly and placing said assembly into a centrifuge.

41. The method of claim 40 wherein said retaining surfaces comprise a rim at the first chamber opening and at least one abutment ridge projecting outwardly from the dispenser housing.

42. The method of claim 38 wherein said passage has at least one media section comprising a solid phase extraction media, said method comprising the step of performing a separation process prior to placing said fluid sample in at least one of said first chamber, conduit means and second chamber.

43. The method of claim 38 further comprising the step of fitting a plug element into at least one of the first chamber and conduit means to seal said second chamber from the atmosphere.

* * * * *